(12) United States Patent (10) Patent No.: US 12,643,279 B2
Schnobrich et al. (45) Date of Patent: Jun. 2, 2026

(54) LAMINATION METHOD

(71) Applicant: 3M INNOVATIVE PROPERTIES COMPANY, St. Paul, MN (US)

(72) Inventors: Scott M. Schnobrich, Stillwater, MN (US); Alvaro Silva Domenighi, St. Paul, MN (US); David M. Rudek, Duesseldorf (DE); Kevin Ellayah, Cergy le Haut (FR)

(73) Assignee: 3M Innovative Properties Company, St. Paul, MN (US)

( * ) Notice: Subject to any disclaimer, the term of this patent is extended or adjusted under 35 U.S.C. 154(b) by 209 days.

(21) Appl. No.: 18/340,570

(22) Filed: Jun. 23, 2023

(65) Prior Publication Data

US 2023/0415401 A1 Dec. 28, 2023

Related U.S. Application Data

(60) Provisional application No. 63/355,416, filed on Jun. 24, 2022.

(51) Int. Cl.
B29C 51/16 (2006.01)
B29C 51/10 (2006.01)
B29C 51/26 (2006.01)

(52) U.S. Cl.
CPC .............. B29C 51/16 (2013.01); B29C 51/10 (2013.01); B29C 51/266 (2013.01)

(58) Field of Classification Search
CPC ...... B29C 51/10; B29C 51/268; B29C 51/445

USPC .......................................................... 156/60
See application file for complete search history.

(56) References Cited

U.S. PATENT DOCUMENTS

| | | | |
|---|---|---|---|
| 2004/0001927 A1* | 1/2004 | Moran ................... | B65D 33/24 |
| | | | 428/36.5 |
| 2005/0184505 A1* | 8/2005 | Barlow ..................... | G09F 3/04 |
| | | | 283/81 |
| 2020/0331683 A1* | 10/2020 | Ghirardi .............. | B65D 77/204 |

OTHER PUBLICATIONS

Taniguchi. C., et al., "English machine-translation by Clarivate Analytics of WO-2015022810-A1 with full WO patent application included., Feb. 19, 2015." (Year: 2015).*

(Continued)

*Primary Examiner* — Abbas Rashid
*Assistant Examiner* — Gregory C. Grosso
(74) *Attorney, Agent, or Firm* — Carlos M. Téllez Rodríguez; 3M Innovative Properties Company

(57) ABSTRACT

Provided is a method of laminating a surfacing film to an article. The method includes disposing a cutting filament onto a peripheral edge of the article, thermoforming a surfacing film onto the article with the cutting filament, peeling the cutting filament away from the peripheral edge of the article to separate a first portion of the surfacing film from a second portion of the surfacing film, and peeling the first portion of the surfacing film away from the second portion of the surfacing film. Significant benefits include simplification of the trimming process and reduced costs by eliminating need for custom trimming tools and/or laser trimming equipment.

13 Claims, 5 Drawing Sheets

(56) References Cited

OTHER PUBLICATIONS https://signetbranding.com, "Ribbon tear strips", Sep. 24, 2021. (Verified as prior art using "WayBackMachine"). (Year: 2021).*

Taniguchi. C., et al., "English machine-translation by Clarivate Analytics of WO-2015022810-A1 with full WO patent application included", Feb. 19, 2015. (See NPL Document Filed on Jul. 14, 2025). (Year: 2015).*

"What is TOM?", Fu-se Vacuum Forming Co. Ltd., [Online], 2012, [retrieved from the internet on Aug. 18, 2023], URL <http://www.fvf.co.jp/eng/technology/index4.html>, 6 pages.

* cited by examiner

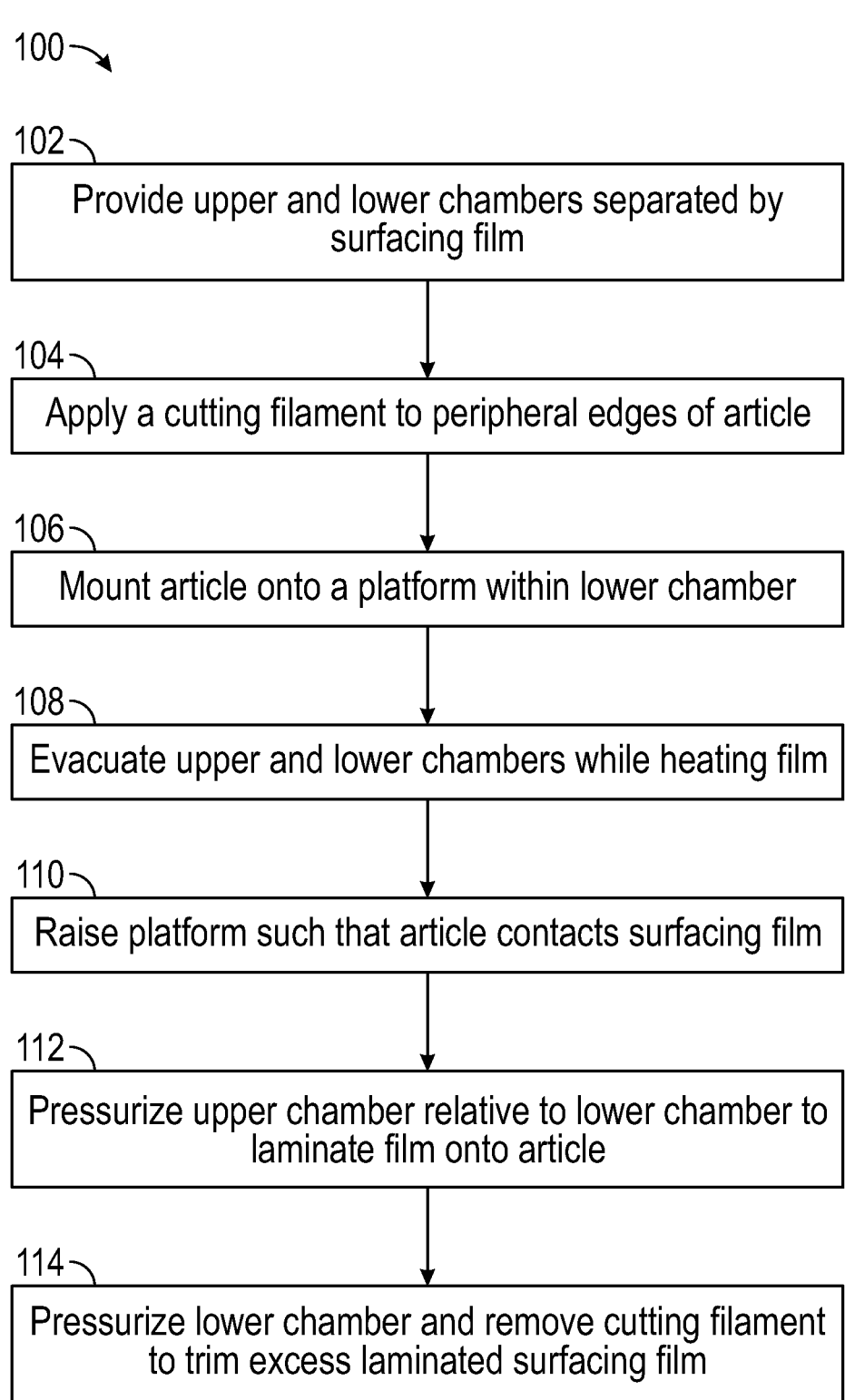

100

102
Provide upper and lower chambers separated by surfacing film

104
Apply a cutting filament to peripheral edges of article

106
Mount article onto a platform within lower chamber

108
Evacuate upper and lower chambers while heating film

110
Raise platform such that article contacts surfacing film

112
Pressurize upper chamber relative to lower chamber to laminate film onto article 114
Pressurize lower chamber and remove cutting filament to trim excess laminated surfacing film

FIG. 1

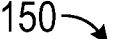
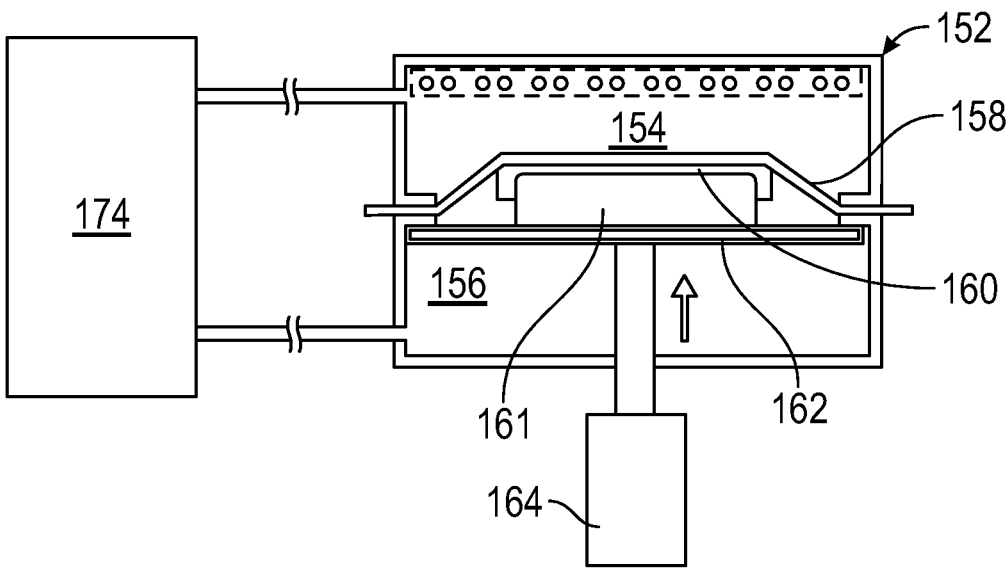
FIG. 3
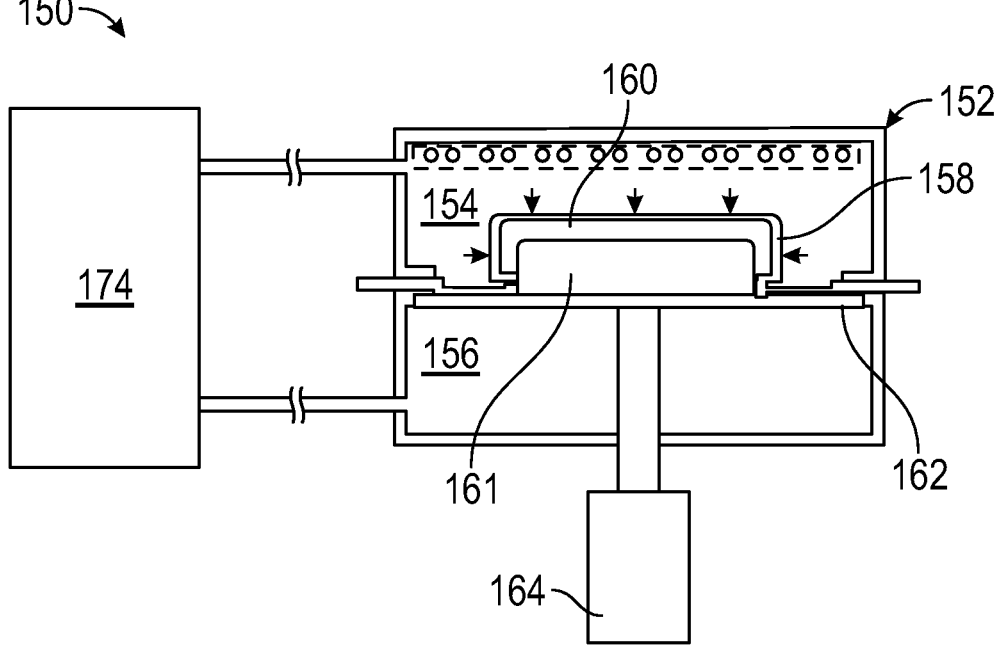
FIG. 4

LAMINATION METHOD

Provided are methods of laminating a surfacing film onto an article. More particularly, methods are provided for laminating a surfacing film onto an article having a customized three-dimensional shape.

BACKGROUND

Dual vacuum thermoforming (DVT) is a process capable of applying surfacing films to contoured three-dimensional surfaces. In a typical DVT process, a thin, adhesive-backed film is initially clamped to a rectangular metal frame along the perimeter of the film. The frame, with the film, is disposed in a hermetically sealed vacuum chamber, where the frame circumscribes the vacuum chamber. The film divides the vacuum chamber into upper and lower vacuum chambers, enabling independent control of pressure/vacuum within each of the upper and lower chambers.

Both chambers are then brought to a vacuum and the film is uniformly heated with infrared heaters mounted at the top of the upper chamber. The temperature to which the film is heated is dependent upon the material properties of the film, in particular the film glass transition temperature. Once it is determined that the film has reached the setpoint temperature via measuring the surface of the film with a pyrometer at multiple locations, the part and jig are move upward, via a hydraulic actuator, into the film. Pressure is then increased in the upper chamber, inducing pressure to push the film against all the surfaces of the part. This allows for the surfacing film to be uniformly applied to complex three-dimensional shapes. Thus applied, excess film is then trimmed away to provide the laminated part.

SUMMARY

The finishing steps in the DVT process can pose significant technical challenges, especially when the film is being formed onto complex three-dimensional parts. In a conventional DVT process, the part is removed from the machine for trimming of the excess film off the part. Trimming is typically done by hand cutting the excess film via razor blades, with custom developed manual cutting tools, or it is automated with expensive laser trimming equipment. Significant benefits would derive from simplifying this process and reducing costs by eliminating the need for custom trimming tools and/or laser trimming equipment.

In a first aspect, a method of laminating a surfacing film onto an article is provided. The method comprises: disposing a cutting filament onto a peripheral edge of the article; thermoforming a surfacing film onto the article with the cutting filament; peeling the cutting filament away from the peripheral edge of the article to separate a first portion of the surfacing film from a second portion of the surfacing film; and peeling the first portion of the surfacing film away from the second portion of the surfacing film.

In a second aspect, a method of laminating a surfacing film onto an article is provided, comprising: applying to a peripheral edge of the article an adhesive-backed tape comprising an adhesive-backed carrier layer and a cutting filament coupled to the adhesive-backed carrier layer, wherein the adhesive-backed carrier layer has adhesives disposed on both of its major surfaces; applying a surfacing film onto the article with the cutting filament such that the adhesive-backed carrier layer is adhesively bonded to both the surfacing film and article; peeling the cutting filament away from the peripheral edge of the article to separate a first portion of the surfacing film from a second portion of the surfacing film; and peeling the first portion of the surfacing film away from the second portion of the surfacing film.

In a third aspect, a laminated article is provided made using one of these methods.

BRIEF DESCRIPTION OF THE DRAWINGS

FIG. 1 is a block diagram showing a method of laminating a surfacing film to an article according to an exemplary embodiment.

FIGS. 2A, 2B, 3, and 4 are side elevational views of a dual-vacuum thermoforming system illustrating various steps in the method of FIG. 1.

Figure 2A:
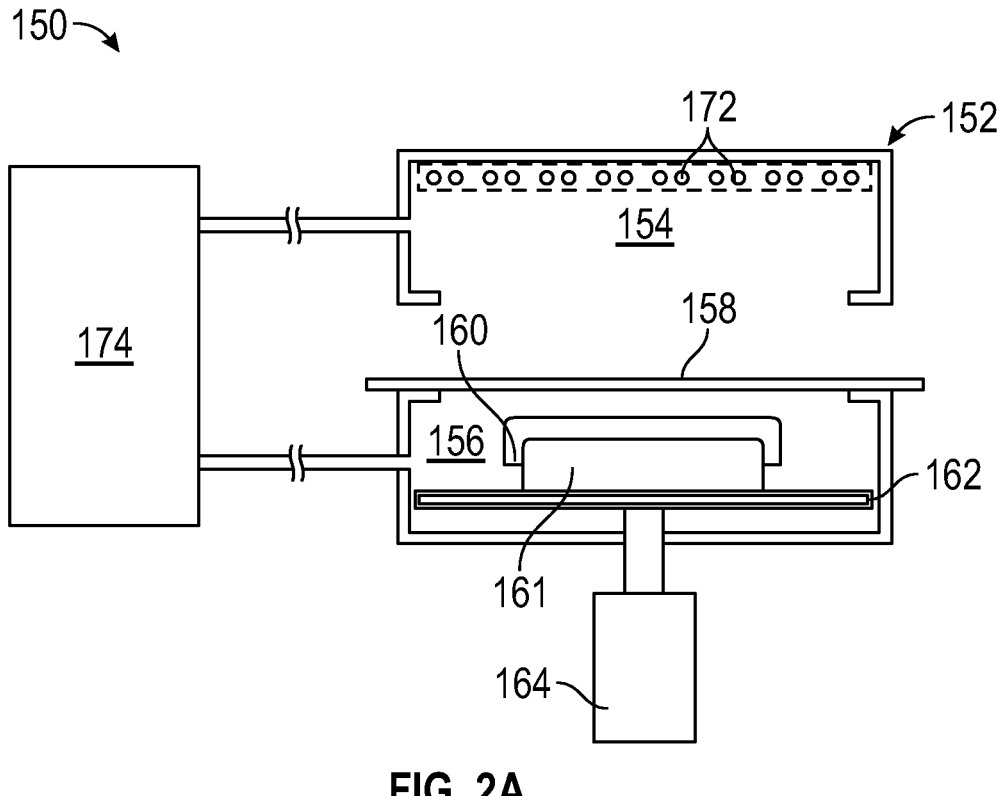

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DETAILED DESCRIPTION

As used herein, the terms "preferred" and "preferably" refer to embodiments described herein that can afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all of the listed elements or a combination of any two or more of the listed elements. It is noted that the term "comprises", and variations thereof do not have a limiting meaning where these terms appear in the accompanying description. Moreover, "a," "an," "the," "at least one," and "one or more" are used interchangeably herein. Relative terms such as left, right, forward, rearward, top, bottom, side, upper, lower, horizontal, vertical, and the like may be used herein and, if so, are from the perspective observed in the particular drawing. These terms are used only to simplify the description, however, and not to limit the scope of the invention in any way.

Reference throughout this specification to "one embodiment," "certain embodiments," "one or more embodiments" or "an embodiment" means that a particular feature, structure, material, or characteristic described relating to the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention.

A method of laminating an article with a surfacing film according to an exemplary embodiment is described in the block diagram of FIG. 1 and hereinafter referred by the numeral 100. The subsequent figures FIGS. 2-4 further illustrate aspects of the lamination equipment, surfacing film, and article at various times while carrying out steps of the method 100.

Figure 2B:
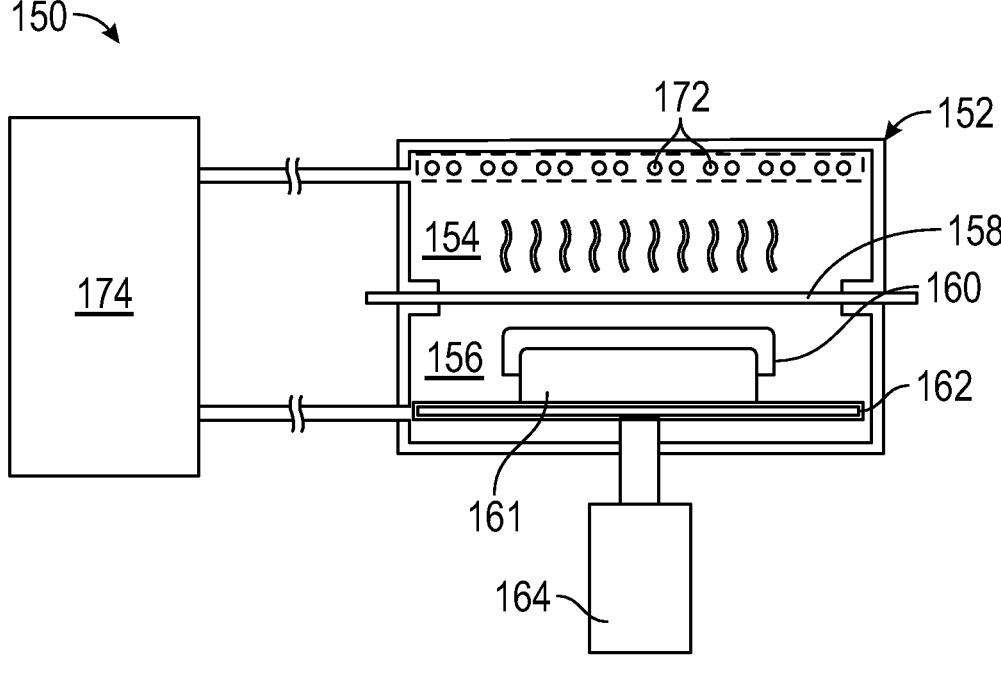

The method 100 begins with the step of providing a vacuum chamber that includes upper and lower vacuum chambers separated by a surfacing film, as represented by block 102. This configuration is shown in FIGS. 2A and 2B, which show a dual-vacuum thermoforming system 150 in its open and close configurations, respectively. It is to be understood, however, that the methods described herein can also be applied to single-vacuum thermoforming systems or any other systems capable of laminating a surfacing film to an article.

The system 150 includes a vacuum chamber 152 that is divided into two mating halves, an upper vacuum chamber 154 and a lower vacuum chamber 156, capable of being reversibly brought together and apart. The upper and lower vacuum chambers 154, 156 are hermetically sealed and separated from each other by surfacing film 158. In some embodiments, the surfacing film 158 is an adhesive-backed surfacing film in which the adhesive is disposed on its major surface facing towards an article 160 to be laminated. The surfacing film 158 is not particularly restricted and exemplary surfacing films can include, for example, paint replacement films, paint protection films, blackout films, graphic vehicle wrap films, and body color films for vehicle coloration and/or vehicle paint protection. The adhesive on the surfacing film 158, if present, can optionally be a heat-activated adhesive that becomes tacky when heated above a certain temperature. For certain applications, a pressure-sensitive adhesive might also be used. The pressure-sensitive adhesive can be made optically clear.

As shown, the article 160 is mounted to a jig 161, which is in turn mounted to a platform 162 within the lower vacuum chamber 156 that is movable. In this case, the platform 162 can be translated upwards and downwards relative to the lower vacuum chamber 156 by first drive unit 164. Optionally and not shown, the upper vacuum chamber 154 could be coupled to a second drive unit that allows the upper vacuum chamber 154 to be translated independently upwards and separated from the lower vacuum chamber 156. Optionally, heaters 172 for softening the surfacing film 158 are provided in the upper vacuum chamber 154. Each of the upper and lower vacuum chambers 154, 156 can be independently de-pressurized or pressurized by vacuum manifold 174.

In the next step of the method 100, a cutting wire is applied to peripheral edges of the article 160 to be laminated (block 104 in FIG. 1). This step can occur before or after the article 160 is mounted to the platform 162. The peripheral edges of the article 160, as referred to above, correspond to the outermost edges of the surface area along the exterior surface of the article 160 to which the surfacing film 158 is to be laminated. In some cases, there could be more than one peripheral edge. In some embodiments, a secondary peripheral edge is used to define an internal area where no lamination is desired—for example, when laminating a vehicle door with a cutout for a window. It to be understood here that the term "peripheral edge," as used herein, is defined based on the intended footprint of the surfacing film 158 on the article 160 after trimming, which may or may not be congruent with the geometry of the article 160.

Notwithstanding the above, for body panels such as vehicular body panels, the peripheral edges are often determined based on the shape of the article 160 and can typically have a shape congruent with the shape of the body panel. It is also common for the peripheral edges to trace along a hidden surface of the panel such that the surfacing film 158 wraps around the outer edges of the panel, ensuring that any visible surfaces of the panel once installed on the vehicle are covered by the surfacing film 158.

Figure 5:
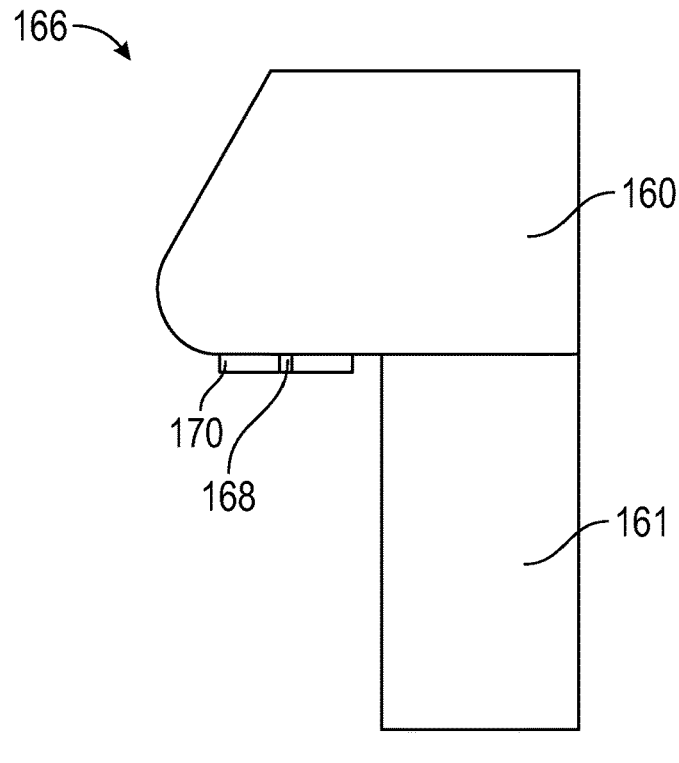
FIG. 5 is an enlarged fragmentary cross-sectional side view of a laminated article prior to trimming.

FIG. 5 shows the result of the step in block 104—a pre-trimming assembly 166 comprised of the article 160 with a cutting filament 168 disposed thereon, and jig 161. In this example, the cutting filament 168 is bonded to an underside of the article 160, tracing along a circuitous path corresponding to its peripheral edge. The cutting filament 168 is in turn embedded within an adhesive-backed carrier layer 170. Optionally and as shown, the cutting filament 168 and carrier layer 170 are provided together in an adhesive-backed tape for convenient positioning and securement of the cutting filament 168 to the article 160 by an operator. The adhesive used for the carrier layer 170 is preferably a pressure-sensitive adhesive. It is further preferable that the pressure-sensitive adhesive can provide good adhesion to the article 160 without need for a primer, yet cleanly peel away from the article 160 without damage, allowing it to be easily re-positioned.

The cutting filament 168 is generally a narrow metal wire having a diameter sufficiently small to make a clean cut through the surfacing film 158 and/or carrier layer 170 as it is peeled away from the peripheral edge of the article 160. The diameter can be, for example, from 500 micrometers to 3000 micrometers, from 500 micrometers to 2000 micrometers, from 500 micrometers to 1000 micrometers, or in some embodiments, less than, equal to, or greater than 500 micrometers, 550, 600, 650, 700, 750, 800, 900, 1000, 1100, 1200, 1300, 1400, 1500, 1600, 1700, 1800, 1900, 2000, 2200, 2500, 2700, or 3000 micrometers. The cutting filament 168 could have any suitable cross-sectional shape, including circular, oval, polygonal, and star-like shapes. Lobed star-like shapes can help provide a keener edge for cutting through the surfacing film 158. Additional refinements are also possible, such as the addition of an abrasive and/or lubricating coating on the surface of the cutting filament 168 that can help provide a clean cut.

The carrier layer 170 preferably is sufficiently wide to allow an operator's fingers to manipulate and apply the tape easily. At the same time, having a carrier layer that is too wide can adversely affect the lateral flexibility of the tape and complicate applying the cutting filament along a curve. Useful carrier layers generally have a transverse width of from 1 millimeter to 1500 millimeters, from 1 millimeters to 50 millimeters, from 1 millimeters to 20 millimeters, or in some embodiments, less than, equal to, or greater than 1 millimeter, 2, 3, 4, 5, 7, 10, 12, 15, 17, 20, 30, 40, 50, 100, 200, 500, 700, 1000, 1200, or 1500 millimeters.

In block 106, the article to be laminated is mounted to a suitable platform within the lower chamber. This is also shown in FIGS. 2A and 2B, where the article 160 is mounted to the platform 162 within lower vacuum chamber 156. As mentioned previously, the order of block 104 and block 106 can be reversed—that is, this mounting step can be carried out before or after the step of applying the cutting filament to the article in block 104.

In block 108, the upper and lower vacuum chambers are evacuated while simultaneously heating the surfacing film. In FIG. 2B, this step can be accomplished by de-pressurizing the upper and lower vacuum chambers 154, 156 using the vacuum manifold 174. It is preferred for both vacuum chambers 154, 156 to be in communication with each other through the vacuum manifold 174 during de-pressurization such that there is little or no pressure differential between the vacuum chambers 154, 156. Heat is imparted to the surfacing film 158 through radiation emitted from the plurality of heaters 172, as also shown in FIG. 2B. This heat raises the temperature of the surfacing film 158 to a thermoforming temperature, typically above its glass transition temperature (T g). The heat applied can also raise the temperature of a heat-activated adhesive on the opposing major surface of the surfacing film 158, if present, above its activation temperature.

With both of the upper and lower vacuum chambers 154, 156 under vacuum, the platform 162 is then elevated, powered by the first drive unit 164, until the article 160 comes into contact with the now-softened surfacing film 158 (block 110). The heaters 172 can continue to operate as needed to maintain the film at a suitable temperature for thermoforming. The moment at which the article 160 contacts the surfacing film time is captured in FIG. 3. At this time, both the upper and lower vacuum chambers 154, 156 are still under vacuum.

Then, as described in block 114 and shown in FIG. 4, air is gradually re-introduced into the upper vacuum chamber 154, while maintaining a vacuum in the lower vacuum chamber 156. With the surfacing film 158 is confirmed to be at its thermoforming temperature, re-pressurization of the upper vacuum chamber 154 causes the film to be thermoformed onto the article 160 with the cutting filament 168, the jig 161, and portions of the platform 162. Advantageously, this DVT method is capable of laminating to complex three-dimensional surfaces, including deep drawn surfaces with convex and/or concave compound curvatures, producing laminated surfacing films with a deep drawn shape. DVT can minimize or eliminate wrinkles and air bubbles that might otherwise form in the spaces between the surfacing film 158 and article 160 when laminated using other methods.

During lamination, the adhesive of the surfacing film 158 can ensure a strong bond to the article 160 and prevent lift off. Preferably, any localized stretching of the surfacing film is inelastic such that there is minimal residual stress in the film after cooling.

In the final step of FIG. 1 represented by block 114, the lower chamber is re-pressurized, the vacuum chamber 152 opened up, and the article 160 removed. After the surfacing film 158 is fully cooled to ensure good adhesion to the article 160, excess portions of the surfacing film are then trimmed away with the assistance of the cutting filament 168. As shown in FIG. 4, these excess portions can include, for example, portions laminated to the article 160, jig 161, platform 162, or any combination thereof.

The operation of the cutting filament 168 in trimming the surfacing film 158 is described as follows. Beginning at one of its ends, the cutting filament 168 is peeled away from the surface of the article 160, leaving behind a clean and sharply-defined cut to separate the inner and outer portions of the surfacing film 158 from each other. Following removal of the cutting filament 168, the outer portion of the surfacing film 158 can be peeled away from the inner portion of the surfacing film 158 to obtain the finished laminated article.

Figure 6:
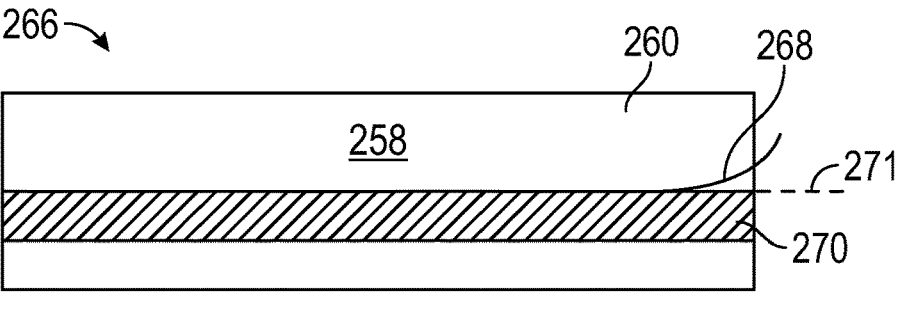
FIGS. 6 and 7 are plan views of a portion of the laminated article prior to trimming according to various embodiments.

Helping to illustrate the operation of the cutting filament is FIG. 6, which shows a plan view of a portion of a pre-trimming assembly 266 including a cutting filament 268 and associated carrier layer 270 disposed on an exemplary article 260 to which a surfacing film 258 has been laminated. The cutting filament 268 traces along a peripheral edge 271, a closed loop defining the desired shape of the laminated surfacing film 258.

In this embodiment, the carrier layer 270 is disposed only on one side of the cutting filament 268, rather than on both sides as shown previously in FIG. 5. Alignment of the cutting filament 268 along the lateral edge of the adhesive-backed carrier layer 270 can provide substantial and unexpected advantages. When the cutting filament 268 is peeled away from the article 260 (away from the plane of the page in FIG. 6) to trim the outer portion away from the inner portion of the surfacing film 258, there is no need to delaminate the edges of the surfacing film 258 to remove the underlying carrier layer 270. Areas covered by the carrier layer 270 only extend along areas corresponding to the excess portion, thereby preserving the integrity of the laminated edge of the inner portion of the surfacing film 258. While this technical benefit might not be critical in all applications, it can be highly advantageous where a permanent bond is formed between the surfacing film 258 and the article 260 during the thermoforming process.

In some embodiments, such as shown in FIG. 5, the cutting filament is not aligned with the lateral edge of the adhesive-backed carrier layer. In these instances, it can be advantageous to remove at least a portion of the adhesive-backed carrier layer after it is applied to the peripheral edge to provide a configuration where the cutting filament is aligned with the lateral edge of the adhesive-backed carrier layer. Optionally, such removal can be aided, for example, by creating a line of weakness (e.g., perforation) in the carrier layer along the cutting filament to assist an operator in such removal.

As a further option, both major surfaces of the carrier layer may be coated with an adhesive, such as a pressure-sensitive adhesive. In certain embodiments, having an adhesive bond on each side of the carrier tape can further improve adhesion to both the underlying article and laminated surfacing film. Where the surfacing film already has an adhesive backing, the adhesive on the top surface of the carrier tape can optionally undergo a chemical reaction with a counterpart adhesive on the surfacing film to provide a chemical bond for even better adhesion. Overall, having strong adhesion on both sides of the cutting filament can provide for a cleaner cut and ultimately better lamination quality along the edges of the surfacing film.

Figure 7:
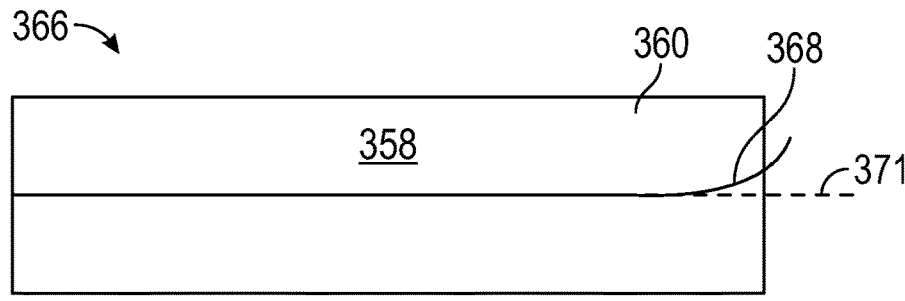

FIG. 7 shows an alternative embodiment of a pre-trimming assembly 366 in which no carrier layer is used when disposing cutting filament 368 onto article 360 beneath surfacing film 358. Instead of using a carrier layer, the cutting filament 368 includes a tacking adhesive (not visible) coated along the entire length and circumference of the cutting filament 368. In this instance, the tacking adhesive serves to adhere the cutting filament 368 to the article 360. The tacking adhesive can be, for example, a pressure-sensitive adhesive. As before, there is no need to delaminate any portion of the surfacing film 358 extending over a desired lamination portion.

Figure 8A:
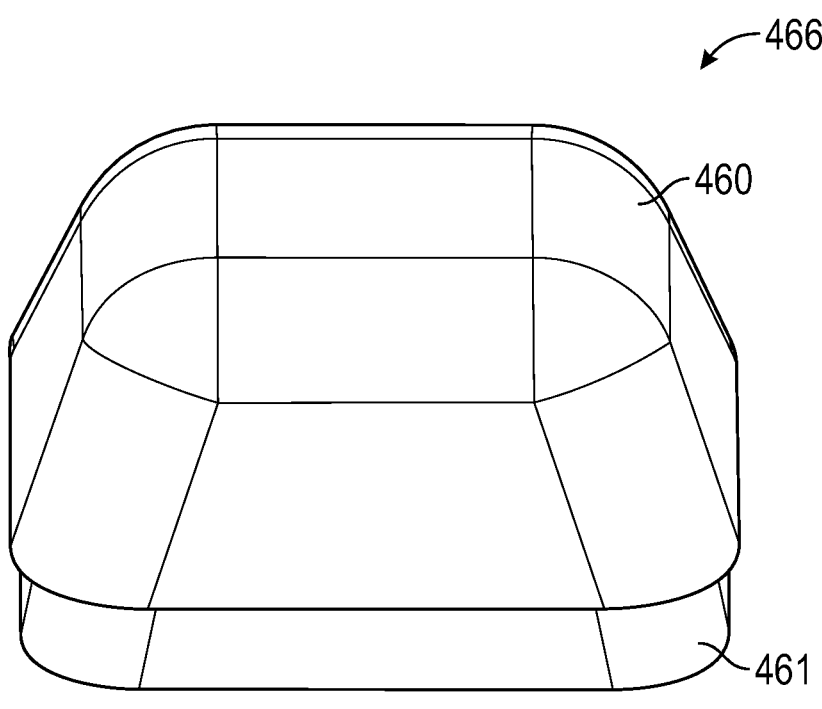
FIGS. 8A and 8B are isometric views of an article in an exemplary method of laminating a surfacing film.
Figure 8B:
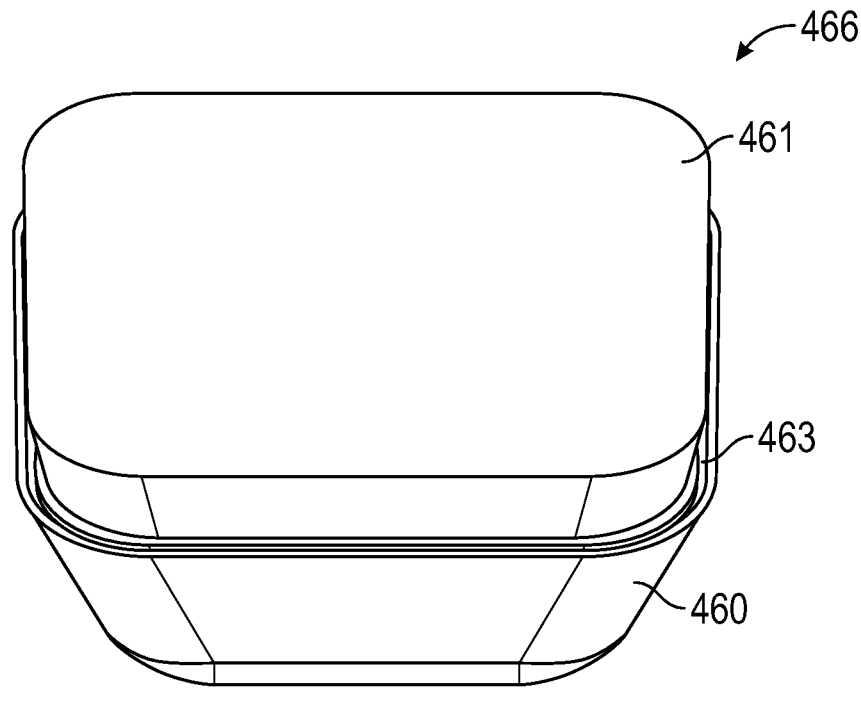

FIGS. 8A and 8B show a pre-trimming assembly 466 in which the article itself includes a physical guide that assists in application of a cutting filament. As shown in these figures, an article 460 is mounted to a jig 461. On the underside of the article 460 is an elongated groove 463 extending along an annular ledge and representing the intended peripheral edge of the surfacing film once laminated to the article 460. The groove 463 has a transverse width that approximately corresponds to the diameter of a suitable cutting filament (not shown) to prevent it from being dislodged during the thermoforming process. To serve this purpose, the elongated channel can have a lateral dimension that is from 80 percent to 120 percent, from 90 percent to 110 percent, from 95 percent to 105 percent, or in some embodiments, less than, equal to, or greater than 80 percent, 85, 90, 95, 100, 105, 110, 115, or 120 percent of the diameter of the cutting filament.

The cutting filament can be manually placed into the groove 463 prior to thermoforming the surfacing film onto the article 460 and jig 461, optionally with an excess length of cutting filament extending outside of the groove to provide operator access. After thermoforming the surfacing film, the operator can then peel away the cutting filament to trim the surfacing film with a clean cut along the groove 463, and then finally remove the outer portion of the surfacing film by peeling it away from the article 460.

In the methods above, various refinements can be implemented to assist removal of the surfacing film from the article. For example, as an optional step, the entire outer portion of the article 260 can be masked with a releasable film or tape prior to thermoforming to facilitate removal of excess surfacing film 258 after trimming. As another option, a separate application tape can be adhesively bonded onto the outer portion of the surfacing film after lamination but prior to peeling the cutting filament away from the article. This application tape, which can selectively cover the outer portion of the surfacing film, can be used as a handle to assist an operator in peeling these unwanted sections of the film away from the article. As a further possibility, the carrier layer itself, as described above, could function as the application tape if made sufficiently wide.

EXAMPLES

Objects and advantages of this disclosure are further illustrated by the following non-limiting examples, but the particular materials and amounts thereof recited in these examples, as well as other conditions and details, should not be construed to unduly limit this disclosure. Unless otherwise noted, all parts, percentages, ratios, etc. in the Examples and the rest of the specification are by weight.

Example 1

In one method according to this invention, a 3M Precision Line Knifeless Tape (obtained from 3M Company, St. Paul, MINN) was applied to a cleaned surface of a polycarbonate/acrylonitrile butadiene styrene (PC-ABS) substrate. An adhesive-backed multilayer acrylic film (3M Company) was applied over the Knifeless Tape and the sample was placed into a Model NGF-0512-S DVT machine, manufactured by Fu-se Vacuum Forming Co., Ltd. in Osaka, Japan, and thermoformed according to manufacturer's instructions. The sample was then removed from the DVT machine, and a portion of the film was removed by pulling on the filament of the Knifeless Tape after waiting 24 hours leaving a trimmed edge. The outer weed section of the film was then peeled away from the inner section bonded to the substrate to provide the finished laminated film.

Example 2

In one method according to this invention, a 3M Precision Line Knifeless Tape was applied to a cleaned surface of a polycarbonate/acrylonitrile butadiene styrene (PC-ABS) substrate. A utility blade was utilized to remove a portion of the carrier liner on the top surface of the Knifeless Tape exposing the filament. An adhesive-backed multilayer acrylic film was applied over the Knifeless Tape and the sample was placed into the aforementioned DVT machine and thermoformed as above. The sample was removed from the DVT machine, and a portion of the film was removed by pulling on the filament of the Knifeless Tape after waiting 24 hours leaving a trimmed edge. The outer weed section of the film was then peeled away from the inner section bonded to the substrate to provide the finished laminated film.

Example 3

In one method according to this invention, a 3M Precision Line Knifeless Tape was applied to a cleaned surface of a polycarbonate/acrylonitrile butadiene styrene (PC-ABS) substrate. A utility blade was utilized to remove a portion of the carrier liner on the top and bottom surfaces of the Knifeless Tape fully exposing the filament. An adhesive-backed multilayer acrylic film was applied over the Knifeless Tape and the sample was placed into the aforementioned DVT machine and thermoformed as above. The sample was removed from the DVT machine, and a portion of the film was removed by pulling on the filament of the Knifeless Tape after waiting 24 hours leaving a trimmed edge. The outer weed section of the film was then peeled away from the inner section bonded to the substrate to provide the finished laminated film.

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

We claim:

1. A method of laminating a surfacing film onto an article comprising:
   disposing a cutting filament onto a peripheral edge of the article;
   thermoforming a surfacing film onto the article with the cutting filament;
   peeling the cutting filament away from the peripheral edge of the article to separate a first portion of the surfacing film from a second portion of the surfacing film; and
   peeling the first portion of the surfacing film away from the second portion of the surfacing film.

2. The method of claim 1, wherein thermoforming the surfacing film onto the article and cutting filament comprises:
   providing an upper vacuum chamber and a lower vacuum chamber that are separated from each other by the surfacing film;
   positioning the article with the cutting filament onto a movable platform within the lower vacuum chamber;
   evacuating both the upper and lower vacuum chambers while heating the surfacing film;
   elevating the movable platform until the article contacts the surfacing film; and
   re-pressurizing the upper vacuum chamber to laminate the surfacing film onto the article with the cutting filament.

3. The method of claim 1, wherein the surfacing film is an adhesive-backed surfacing film.

4. The method of claim 3, wherein the adhesive-backed surfacing film comprises a heat-activated adhesive.

5. The method of claim 4, wherein the thermoforming step occurs in a vacuum chamber that includes upper and lower vacuum chambers separated by the surfacing film, wherein the upper and lower vacuum chambers are evacuated while heating the surfacing film to a temperature at or above an activation temperature of the heat-activated adhesive.

6. The method of claim 1, wherein disposing the cutting filament onto the peripheral edge of the article comprises applying to the peripheral edge an adhesive-backed tape comprising an adhesive-backed carrier layer and the cutting filament coupled to the adhesive-backed carrier layer.

7. The method of claim 6, wherein the adhesive-backed carrier layer has a transverse width of from 1 millimeter to 1500 millimeters.

8. The method of claim 6, wherein the cutting filament is aligned with a lateral edge of the adhesive-backed carrier layer.

9. The method of claim 6, wherein the cutting filament is not aligned with the lateral edge of the adhesive-backed carrier layer, and further comprising removing at least a portion of the adhesive-backed carrier layer after it is applied to the peripheral edge to align the cutting filament with the lateral edge of the adhesive-backed carrier layer.

10. The method of claim 1, wherein the cutting filament is at least partially coated with a tacking adhesive, and optionally a pressure-sensitive adhesive.

11. The method of claim 1, wherein the cutting filament is captured within an elongated groove provided along the peripheral edge of the article.

12. The method of claim 11, wherein the elongated groove has a lateral dimension that is from 80 percent to 120 percent of a diameter of the cutting filament.

13. The method of claim 1, wherein areas of the second portion adjacent to the peripheral edge remain laminated to the article when peeling away the cutting filament.

* * * * *